United States Patent
Yun

(10) Patent No.: US 11,322,134 B2
(45) Date of Patent: May 3, 2022

(54) ARTIFICIAL INTELLIGENCE DEVICE AND OPERATING METHOD THEREOF

(71) Applicant: LG ELECTRONICS INC., Seoul (KR)

(72) Inventor: Hwansik Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 16/855,872

(22) Filed: Apr. 22, 2020

(65) Prior Publication Data

US 2021/0174786 A1    Jun. 10, 2021

(30) Foreign Application Priority Data

Dec. 10, 2019   (KR) .................. 10-2019-0163879

(51) Int. Cl.
| | | |
|---|---|---|
| G10L 15/00 | (2013.01) | |
| G10L 15/14 | (2006.01) | |
| G10L 15/06 | (2013.01) | |
| G10L 15/32 | (2013.01) | |

(52) U.S. Cl.
CPC ............ G10L 15/14 (2013.01); G10L 15/063 (2013.01); G10L 15/32 (2013.01)

(58) Field of Classification Search
CPC ....... G10L 15/14; G10L 15/063; G10L 15/32; G10L 15/183; G10L 25/81; G10L 15/20; G10L 15/06; G10L 15/16; G10L 21/0216; G10L 2015/0635; G06N 3/0454; G06N 3/08
See application file for complete search history.

(56) References Cited

U.S. PATENT DOCUMENTS

| | | | |
|---|---|---|---|
| 9,153,231 B1* | 10/2015 | Salvador | G10L 15/065 |
| 9,401,140 B1* | 7/2016 | Weber | G10L 15/00 |
| 9,911,413 B1* | 3/2018 | Kumar | G10L 15/16 |
| 2016/0203828 A1* | 7/2016 | Gomez | G10L 15/20 |
| | | | 704/226 |
| 2016/0284349 A1* | 9/2016 | Ravindran | G10L 15/20 |
| 2017/0092268 A1* | 3/2017 | Kristjansson | G10L 15/16 |
| 2018/0211652 A1* | 7/2018 | Mun | G10L 15/02 |
| 2020/0005775 A1* | 1/2020 | Hanazawa | G10L 15/02 |
| 2020/0043468 A1* | 2/2020 | Willett | G06N 3/082 |
| 2020/0175961 A1* | 6/2020 | Thomson | G06F 21/6245 |

* cited by examiner

*Primary Examiner* — Abdelali Serrou
(74) *Attorney, Agent, or Firm* — Lee Hong Degerman Kang & Waimey

(57) ABSTRACT

An artificial intelligence (AI) device may acquire a probability that a received speech signal is classified as a noise signal, calculate a confidence level of a first model for determining to which phoneme the speech signal belongs, based on the speech signal, determine a weight of the first model based on the probability and the confidence level of the first model, and output a speech recognition result of the speech signal using the determined weight of the first model.

18 Claims, 10 Drawing Sheets

| UNIT FRAME | PROBABILITY OF NOISE SIGNAL |
|---|---|
| 1 | 0.55 |
| 2 | 0.8 |
| ... | ... |
| N | 0.7 |

ARTIFICIAL INTELLIGENCE DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0163879, filed on Dec. 10, 2019, the contents of which are hereby incorporated by reference herein in its entirety.

FIELD

The present disclosure relates to an artificial intelligence (AI) device, and more particularly, to an AI device for outputting a continuous speech recognition result.

BACKGROUND

A model for continuous speech recognition is divided into an acoustic model and a language model. The acoustic model outputs a score indicating to which phoneme speech input of each frame unit is close. The language model outputs a score indicating a probability of occurrence for a given word string.

A speech recognition result is determined in a manner of deriving a final score by applying a weight to each of the acoustic model and the language model.

As a final speech recognition result, a recognition candidate having a highest final score is selected from among a plurality of recognition candidates. That is, the final speech recognition result may vary according to the weight applied to the acoustic model or the language model.

An existing speech recognizer cannot output optimal speech recognition performance, because the weight of the acoustic model and the weight of the language model are fixed. In particular, in a noisy environment, power of discrimination of the acoustic model is weakened and thus the language model may play an important role in recognition performance.

SUMMARY

An object of the present disclosure is to improve speech recognition performance, by adjusting the weight of an acoustic model according to an input speech signal.

Another object of the present disclosure is to improve speech recognition performance, by decreasing the weight of an acoustic model and increasing the weight of a language model when a speech signal includes a noise signal or a silent signal.

Another object of the present disclosure is to improve speech recognition performance, by changing the weight of an acoustic model over time with respect to an input speech signal.

An artificial intelligence (AI) device may acquire a probability that a received speech signal is classified as a noise signal, calculate a confidence level of a first model for determining to which phoneme the speech signal belongs, based on the speech signal, determine a weight of the first model based on the probability and the confidence level of the first model, and output a speech recognition result of the speech signal using the determined weight of the first model.

In the AI device, the weight of the first model may vary according to each of a plurality of unit frames configuring the speech signal.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

Artificial Intelligence (AI)

Figure 1:
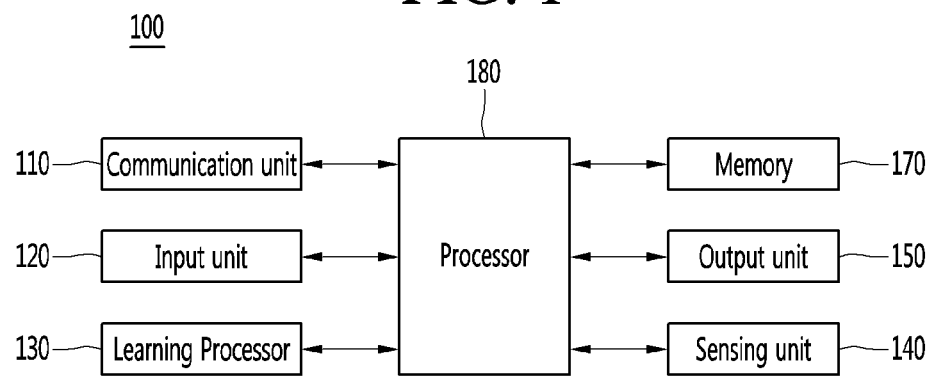
FIG. 1 illustrates an AI device according to an embodiment of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined path, and a technology for automatically setting and traveling a path if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing device 140, an output device 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
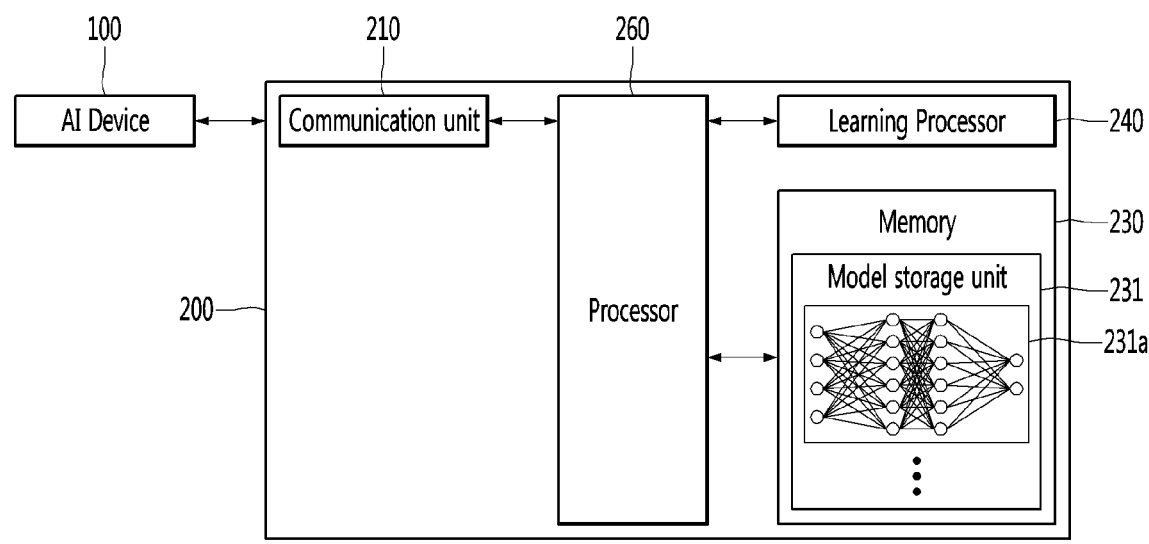
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
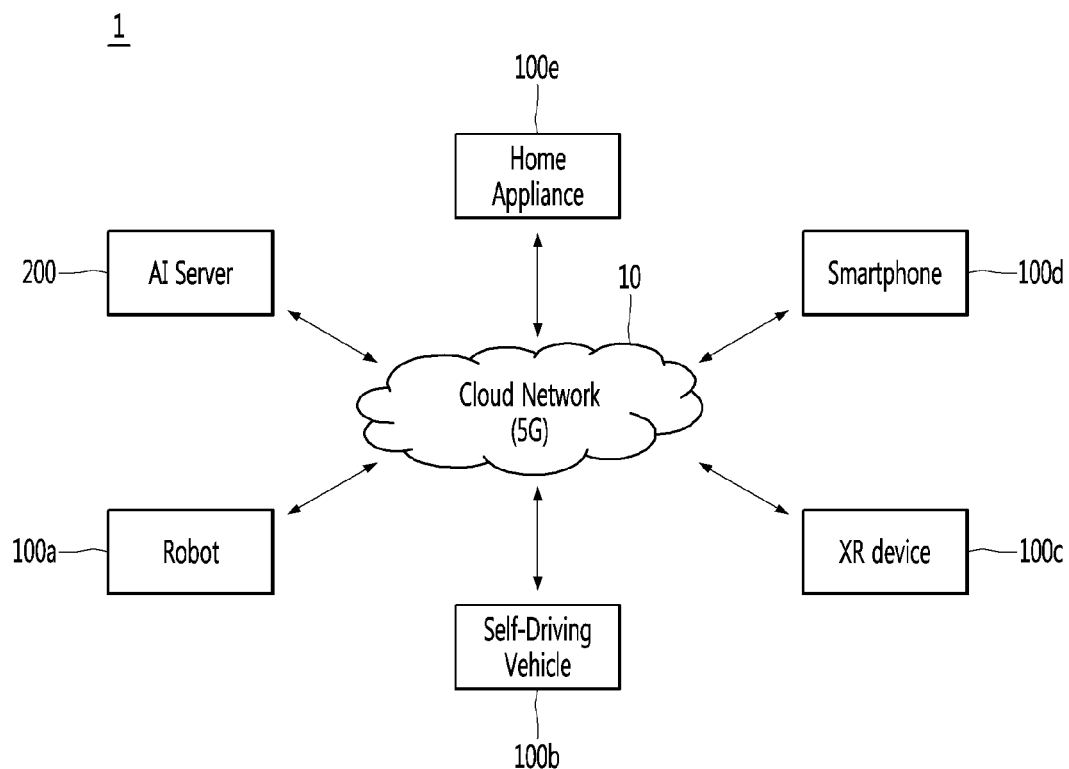
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the path and the travel plan, may determine the response to user interaction, or may determine the operation.

The robot 100a may use the sensor information acquired from at least one sensor among the lidar, the radar, and the camera so as to determine the travel path and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

In this case, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel path and the travel plan, and may control the driving device such that the robot 100a travels along the determined travel path and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. In this case, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel path or the travel plan. For example, the robot 100a and the self-driving vehicle 100b having the self-driving function may determine at least one of the travel path or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

In this case, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, if it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot In other words subjected to control/interaction in an XR image. In this case, the robot 100a may be separated from the XR device 100c and interwork with each other.

If the robot 100a, which is subjected to control/interaction in the XR image, may acquire the sensor information from the sensors including the camera, the robot 100a or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

AI+Self-Driving+XR

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle In other words subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
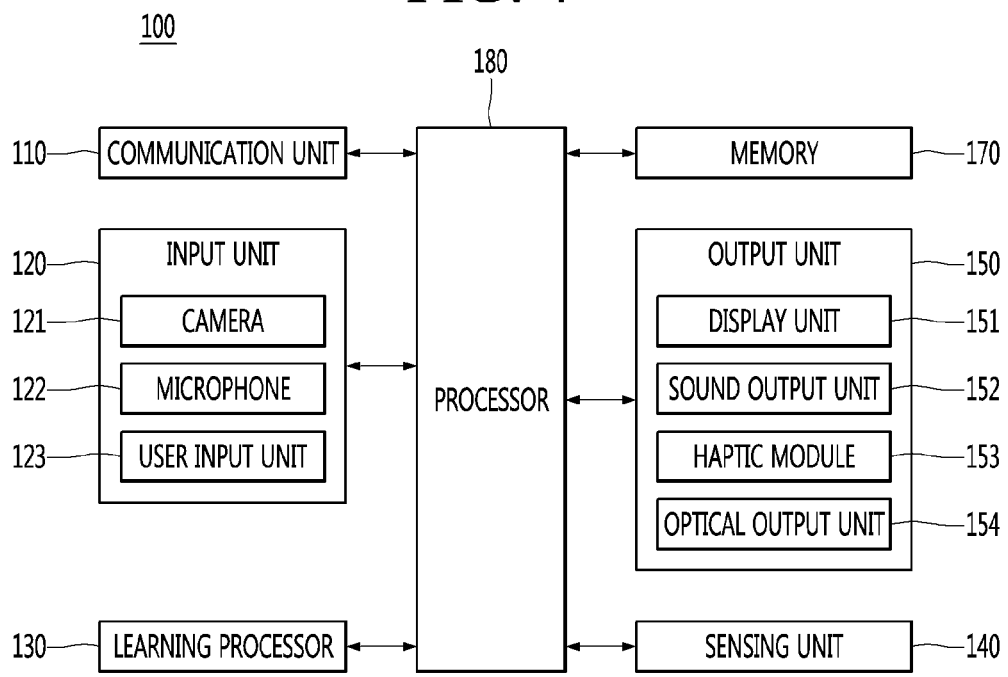
FIG. 4 illustrates an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and if information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output device 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

Figure 5:
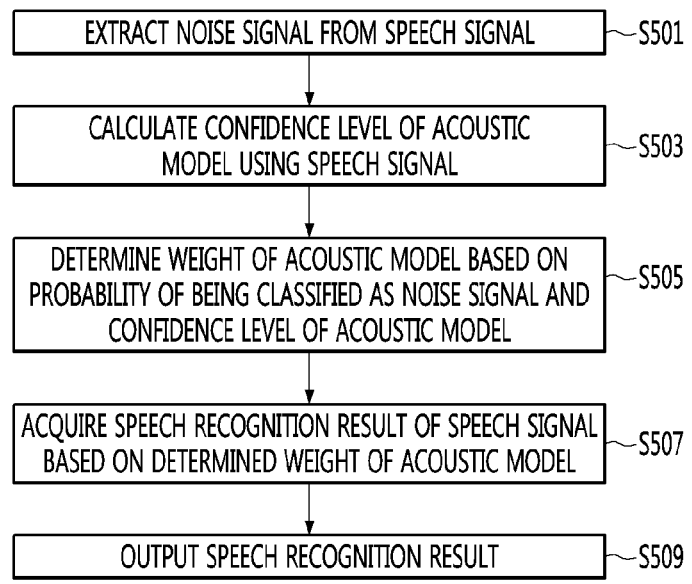
FIG. 5 is a flowchart illustrating a method of operating an AI device according to an embodiment of the present disclosure.

FIG. 5 is a flowchart illustrating a method of operating an AI device according to an embodiment of the present disclosure.

The operating method of FIG. 5 may be performed by the processor 260 of the AI server 200. This will be described below.

The processor 180 of the AI device 100 extracts a noise signal from a speech signal (S501).

The processor 180 may extract the noise signal from the speech signal using a noise signal estimation model.

The processor 180 may acquire a probability that each of a plurality of unit sections (or unit frames) configuring the speech signal is classified as noise.

The noise signal estimation model may be an artificial neural network model trained by a deep learning algorithm or a machine learning algorithm.

The noise signal estimation model may refer to a model for estimating a probability that each of a plurality of sections configuring the speech signal is classified as a noise signal.

The noise signal estimation model may be trained by the learning processor 130 of the AI device 100. The noise signal estimation model may be stored in the memory 170.

The learning process of the noise signal estimation model and the process of extracting the noise signal from the speech signal according to the learned model will be described with reference to FIGS. 6 to 8.

Figure 6:
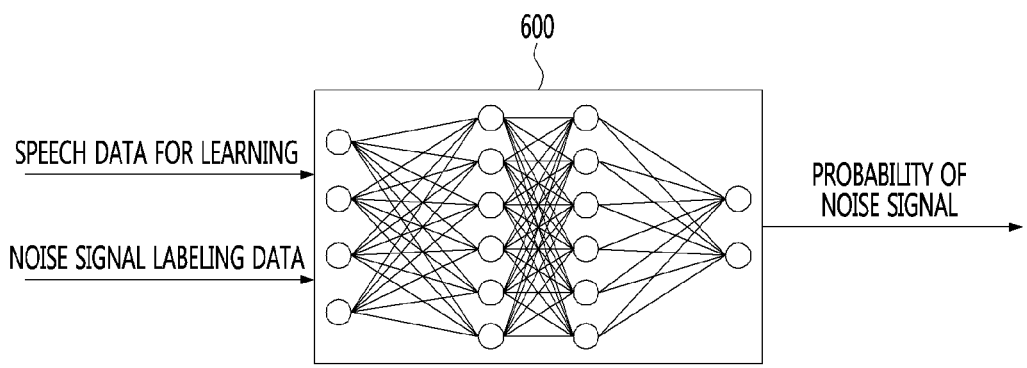
FIG. 6 is a view illustrating a learning process of a noise signal estimation model according to an embodiment of the present disclosure.
Figures 7, 8:
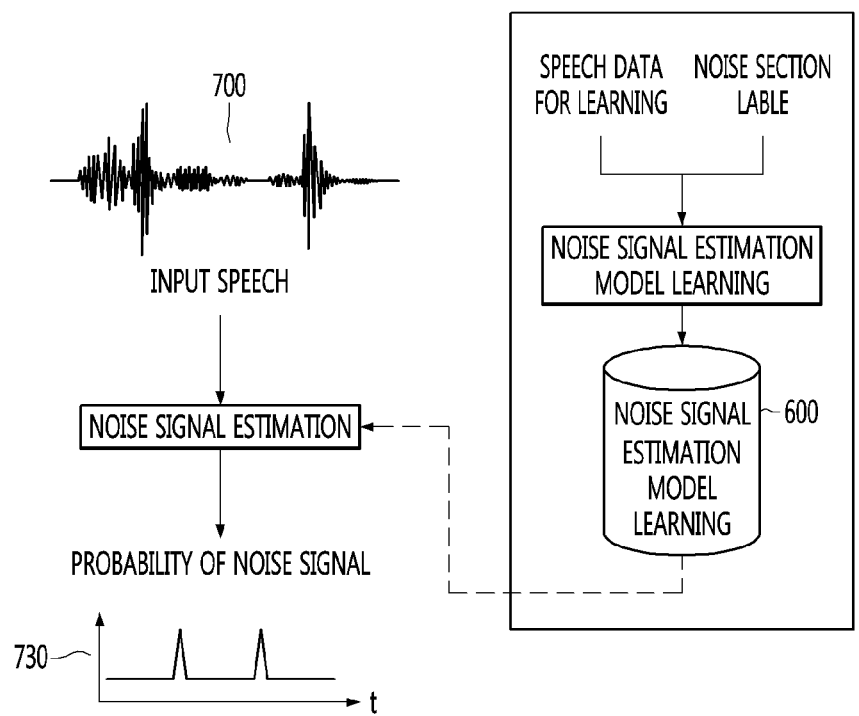
FIG. 7 is a view illustrating a process of extracting a noise signal from an input speech signal using the learned noise signal estimation model.
FIG. 8 is a view showing a probability that each of a plurality of unit frames configuring a speech signal is classified as noise.

FIG. 6 is a view illustrating a learning process of a noise signal estimation model according to an embodiment of the present disclosure, FIG. 7 is a view illustrating a process of extracting a noise signal from an input speech signal using the learned noise signal estimation model, and FIG. 8 is a view showing a probability that each of a plurality of unit frames configuring a speech signal is classified as noise.

Referring to FIG. 6, the noise signal estimation model 600 may output the probability that a corresponding section is classified as a noise signal for each section (or frame) of speech data, from training data including speech data for learning and labeling data indicating the noise signal.

A time section (or one frame) of the speech data may be a partial signal corresponding to 0.5 s, but this is merely an example.

The noise signal estimation model 600 may be trained to minimize a cost function corresponding to a difference between a probability indicated by the labeling data and a probability of being classified as a noise signal.

For example, the probability indicated by the labeling data may be 0 or 1. When the probability indicated by the labeling data is 1, the speech data of the corresponding section may correspond to the noise signal and, when the probability indicated by the labeling data is 0, the speech data of the corresponding section may correspond to a signal other than the noise signal.

The speech signal for learning used for learning of the noise signal estimation model 600 may be labeled with a probability value (0 or 1) indicating the noise signal, and the noise signal estimation model 600 may be trained using the labeled learning data.

The noise signal estimation model 600 may be trained for the purpose of accurately inferring the probability of being classified as the labeled noise signal from the given speech data for learning.

The cost function of the noise signal estimation model 600 may be represented by the square mean of a difference between the label for the probability of being classified as the noise signal corresponding to each speech data for learning and the probability of being classified as a noise signal inferred from a training data set.

In the noise signal estimation model 600, model parameters included in the artificial neural network may be determined to minimize the cost function through supervised learning.

When an input feature vector is extracted from the speech data for learning and input to the noise signal estimation model 600, a probability of being classified as the noise signal may be output as a target feature vector.

The noise signal estimation model 600 may be trained to minimize the value of the cost function corresponding to a difference between an output target feature vector and labeled labeling data.

Referring to FIG. 7, a process of extracting, from the input speech signal, a probability distribution in which the speech signal is classified as a noise signal is shown.

That is, the processor 180 may acquire the probability distribution 710 of the noise signal corresponding to the speech signal from the speech signal input via the microphone 122 using the previously learned the noise signal estimation model 600.

The processor 180 may acquire probabilities of being the noise signal inferred from the noise signal estimation model 600 with respect to each of the plurality of sections configuring the input speech signal. Thereafter, the processor 180 may acquire the noise signal probability distribution 710 which is a distribution of the acquired probabilities over time.

Referring to FIG. 8, probability values in which each of the plurality of unit frames is classified as a noise signal.

The sections of the entire speech signal may be divided by a predetermined time interval. The predetermined time may be 0.5 s, but this is merely an example.

FIG. 5 will be described again.

The process of extracting the noise signal from the speech signal in step S501 may be a process of acquiring the probability distribution 710 in which each of the plurality of sections configuring the speech signal is classified as the noise signal.

The processor 180 of the AI device 100 calculates the confidence level of the acoustic model based on the speech signal (S503).

The acoustic model may refer to a model for outputting a score indicating to which phoneme a unit speech signal of each frame unit (each section unit) is close.

The acoustic model may be stored in the memory 170.

The confidence level of the acoustic model may indicate a degree indicating how reliable the score output by the acoustic model is with respect to the input speech signal.

The confidence level of the acoustic model may be obtained from entropy calculated based on the output of the acoustic model.

The process of measuring the confidence level of the acoustic model will be described with reference to the following drawings.

Figure 9:
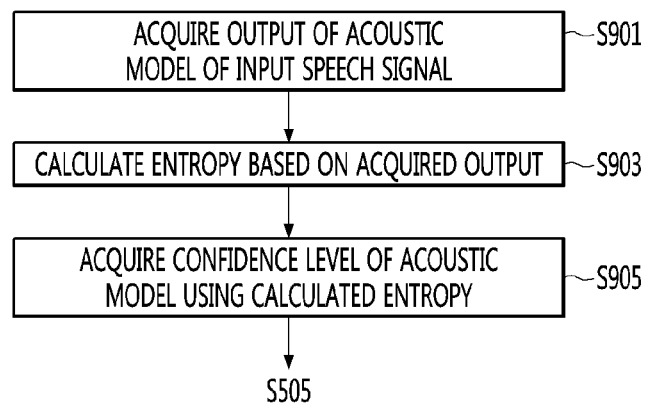
FIGS. 9 and 10 are views illustrating a process of measuring a confidence level of an acoustic model for an input speech signal according to an embodiment of the present disclosure.
Figure 10:
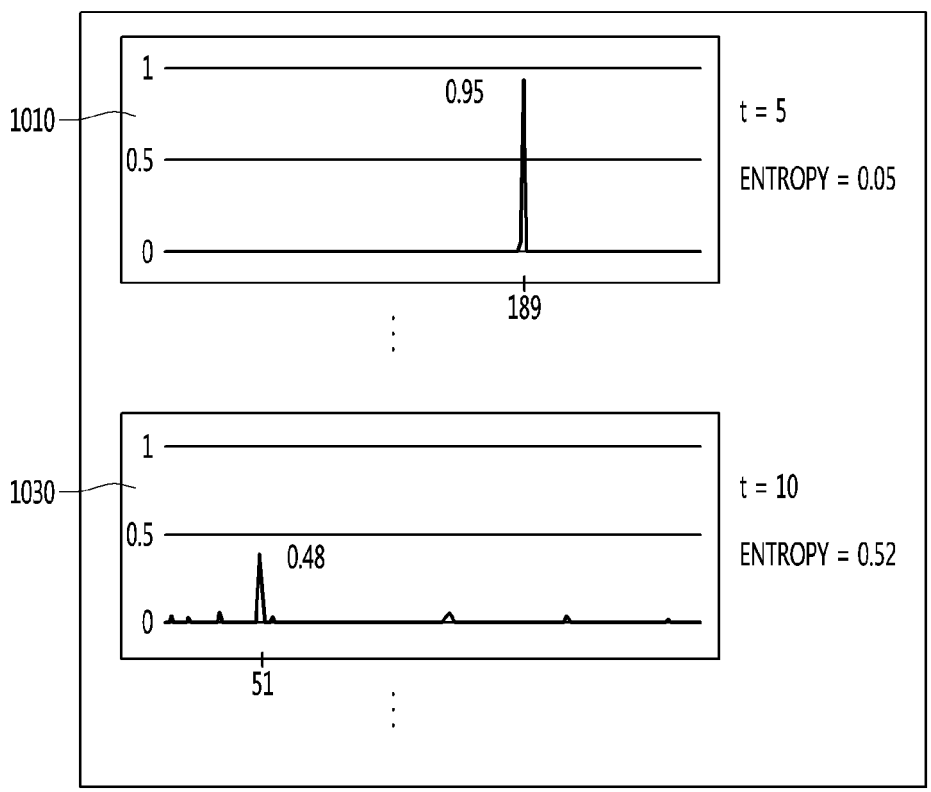

FIGS. 9 and 10 are views illustrating a process of measuring a confidence level of an acoustic model for an input speech signal according to an embodiment of the present disclosure.

In particular, FIG. 9 is a flowchart illustrating a process of acquiring the confidence level of the acoustic model.

Referring to FIG. 9, the processor 180 of the AI device 100 acquires the output of the acoustic model for the input speech signal (S901).

The acoustic model may refer to a model for outputting a score indicating to which phoneme the speech signal is close, as a model for speech recognition.

The acoustic model may output a probability distribution of a class (e.g., phoneme) corresponding to each of a plurality of unit frames (unit sections) configuring the speech signal.

This will be described below.

The processor 180 of the AI device 100 calculates entropy based on the acquired output of the acoustic model (S903).

The processor 180 of the AI device 100 acquires the confidence level of the acoustic model using the calculated entropy (S905).

The process of calculating the entropy of the acoustic model using the output of the acoustic model.

Referring to FIG. 10, a first class probability distribution 1010 output by the acoustic model for a first unit frame at t=5 and a second class probability distribution 1030 output by an acoustic model for a second unit frame at t=10 are shown. Here, a value of t may have a time range.

The horizontal axis of a graph, on which the first class probability distribution 1010 and the second class probability distribution 1030 are represented, may be the order of a vector and the vertical axis of the graph may be a probability value.

The order of the vector may correspond to a phoneme such as <a>, <b> or <c>.

The first class probability distribution 1010 shows an example of a probability distribution for a plurality of classes (a plurality of phonemes). Referring to the first class probability distribution 1010, the probability values for the vector of order 189 is concentrated at 0.95. The vector of order 189 may correspond to a class (or a phoneme) <a>.

The processor 180 may determine that the output value of the acoustic model is concentrated at a specific class in a first unit frame at t=5 through the first class probability distribution 1010.

In this case, the processor 180 may determine that the entropy of the acoustic model for the first unit frame is low.

The processor 180 may calculate, as entropy, a difference between the largest probability value of the plurality of classes and 1 through the first class probability distribution 1010.

For example, since the probability value of Class 189 on the first class probability distribution 1010 is 0.95 and is largest, the processor 180 may calculate 0.05 obtained by subtracting 0.95 from 1 as the entropy of the acoustic model.

The processor 180 may acquire the reciprocal of the calculated entropy of the acoustic model as the confidence level of the acoustic model. That is, the confidence level of the acoustic model for the first unit frame may be determined as 1/(0.05)=20.

Similarly, the second class probability distribution 1030 shows an example of the probability distribution for the plurality of classes (a plurality of phonemes). Referring to the second class probability distribution 1030, the probability values for the vector of order 51 is concentrated at 0.48. The vector of order 51 may correspond to a class (or a phoneme) <b>.

The processor 180 may determine that the output value of the acoustic model is distributed without being concentrated at a specific class in a second unit frame through the second class probability distribution 1030, unlike the first class probability distribution 1010.

In this case, the processor 180 may determine that the entropy of the acoustic model for the second unit frame is high.

The processor 180 may calculate, as entropy, a difference between the largest probability of the plurality of classes and 1 through the second class probability distribution 1030.

For example, since the probability value of Class 51 on the second class probability distribution 1030 is 0.48 and is largest, the processor 180 may calculate 0.52 obtained by subtracting 0.48 from 1 as entropy.

The processor 180 may acquire the reciprocal of the calculated entropy of the acoustic model as the confidence level of the acoustic model. That is, the confidence level of the acoustic model for the second unit frame may be determined as 1/(0.52)=1.923.

The confidence level of the acoustic model for the second unit frame may be less than that of the acoustic model for the first unit frame. That is, in the second unit frame, it may be determined that the confidence level of the acoustic model is lowered due to the noise signal.

The entropy of the acoustic model may be used as a criterion for determining whether the confidence level of the acoustic model is high or low.

FIG. 5 will be described again.

The processor 180 of the AI device 100 determines the weight of the acoustic model based on the probability distribution of the noise signal and the confidence level of the acoustic model (S505).

The processor 180 may determine the weight of the acoustic model based on the probability value of the noise signal and the confidence level of the acoustic model, using a weight estimation model.

The weight estimation model may be an artificial neural network based model trained by a deep learning algorithm or a machine learning algorithm.

The weight estimation model may be trained by supervised learning.

The weight estimation model may refer to a model for estimating an optimal weight from a probability that the speech signal is a noise signal and the confidence level of the acoustic model.

The learning process of the weight estimation model and the process of determining the weight of the acoustic model using the weight estimation model will be described with reference to the following drawings.

Figure 11:
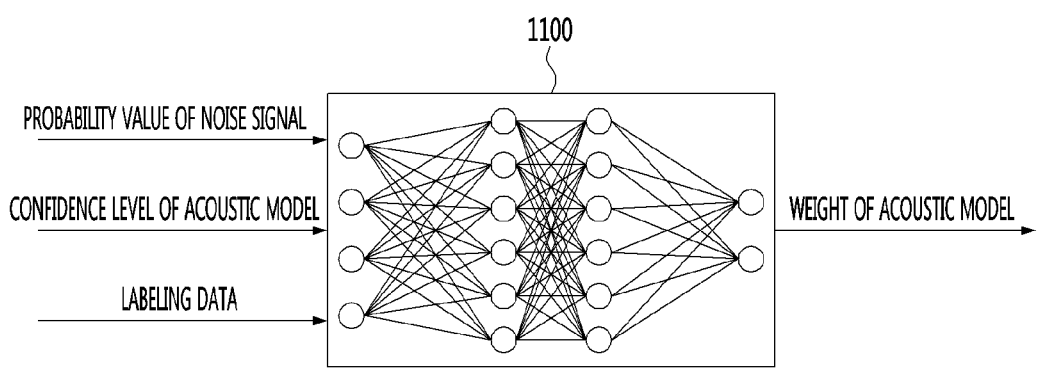
FIG. 11 is a view illustrating a learning process of a weight estimation model according to an embodiment of the present disclosure.
Figure 12:
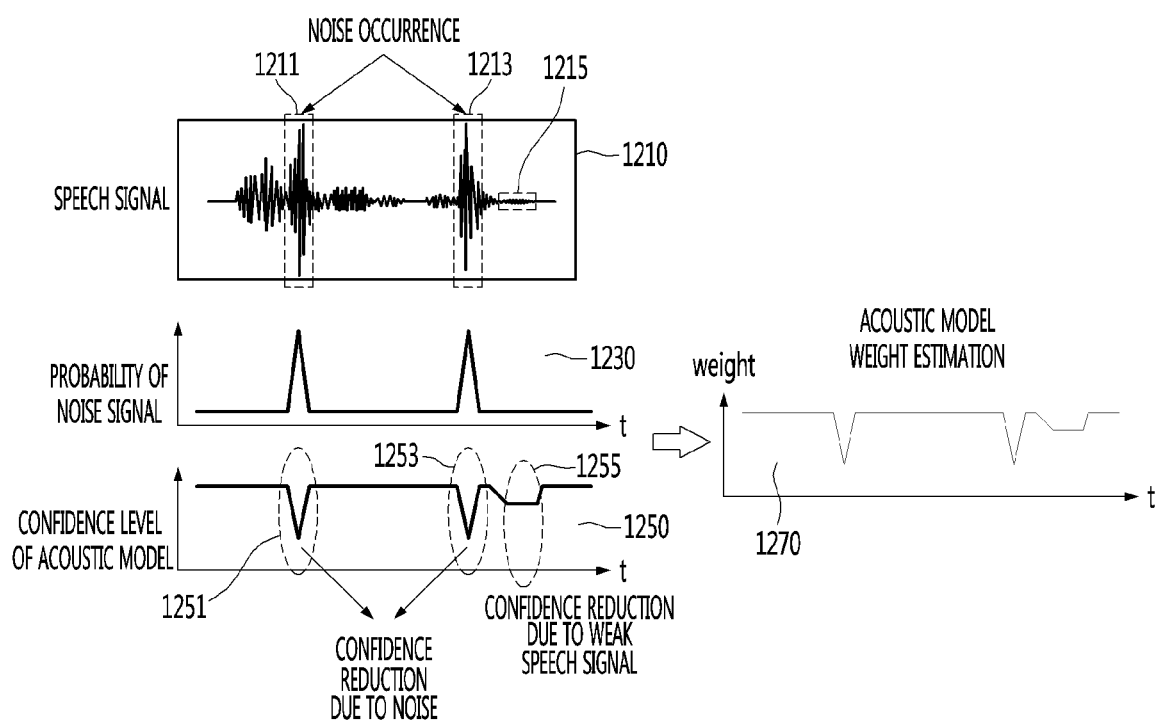
FIG. 12 is a view illustrating an example of estimating a weight of an acoustic model according to the learned weight estimation model.

FIG. 11 is a view illustrating a learning process of a weight estimation model according to an embodiment of the present disclosure, and FIG. 12 is a view illustrating an example of estimating a weight of an acoustic model according to the learned weight estimation model.

Referring to FIG. 11, the weight estimation model 1100 may refer to a model trained by supervised learning based on the artificial neural network.

The training data set for learning of the weight estimation model 1100 may include a probability value of being classified as a noise signal, a confidence level of an acoustic model and a labeling data labeled therein, for each frame of the speech data for learning. The labeling data may be the weight of the acoustic model as correct answer data.

The weight estimation model 1100 may be trained to minimize a cost function corresponding to a difference between the weight of the acoustic model and the weight indicated by the labeling data, as an inference result.

The weight estimation model 1100 may be trained to accurately infer the weight of the labeled acoustic model from the given training data set.

In the weight estimation model 1100, model parameters included in the artificial neural network may be determined to minimize the cost function through supervised learning.

When the input feature vector is extracted from the probability value for learning and the confidence value and input to the weight estimation model 1100, the weight of the acoustic model may be output as a target feature vector.

The weight estimation model 1100 may be trained to minimize the value of the cost function corresponding to a difference between the output target feature vector and the labeled labeling data.

Referring to FIG. 12, a process of obtaining the weight of the acoustic model through the trained weight estimation model 1200 is shown.

The speech signal 1200 input through the microphone 122 may include a first noise signal 1211, a second noise signal 1213 and a silent signal 1215.

The silent signal 1215 may be a speech signal having an amplitude less than a predetermined amplitude.

The processor 180 may acquire a probability distribution 1230 indicating probabilities of being classified as the noise signal, with respect to each unit frame of the speech signal 1200, using the noise signal estimation model 600.

The processor 180 may acquire a confidence level progress graph 1250 indicating the confidence level of the acoustic model using the probability distribution 1230. This was described with reference to FIGS. 9 and 10.

The confidence level progress graph 1250 may include a first confidence level reduction interval 1251 according to the first noise signal 1211 indicating occurrence of noise and a second confidence level reduction interval according to the second noise signal 1213.

In addition, the confidence level progress graph 1250 may include a third confidence level reduction interval according to the silent signal 1215.

That is, the confidence level of the acoustic model may be lowered not only by occurrence of noise but also by silence.

The processor 180 may determine the weight of the acoustic model from the probability distribution 1230 of the noise signal and the confidence level progress graph 1250 using the weight estimation model 1100.

The processor 180 may acquire a weight change graph 1270 indicating change in weight of the acoustic model over time.

As described above, the processor 180 may determine the weight of the acoustic model for each unit frame of the speech signal, using the weight estimation model 1100.

FIG. 5 will be described again.

Meanwhile, when the weight of the acoustic model is determined, the weight of the language model may be automatically determined according to the weight of the acoustic model.

For example, the processor 180 may determine that the weight of the language model is (1−0.8)=0.2, when the weight of the acoustic model is 0.8. As described above, a sum of the weight of the acoustic model and the weight of the language model may be 1. However, this is merely an example.

The processor 180 of the AI device 100 acquires the speech recognition result of the speech signal based on the determined weight of the acoustic model (S507).

The processor 180 may determine the weight of the language model based on the weight of the acoustic model and acquire the speech recognition result of the speech signal based on the determined weights.

The speech recognition result may be a result obtained by converting speech data corresponding to the speech signal into text data.

The speech recognition result may include the result of analyzing the intention of the converted text data.

The processor 180 of the AI device 100 outputs the acquired speech recognition result (S509).

The processor 180 may output the speech recognition result via the display unit 151 or the sound output unit 152 included in the output device 150.

According to the embodiment of the present disclosure, it is possible to improve speech recognition performance, by tracking an optimal weight of the acoustic model according to the input speech signal.

In addition, it is possible to greatly improve speech recognition performance, by applying the weight of the acoustic model varying over time to the entire speech signal instead of a fixed weight.

Figure 13:
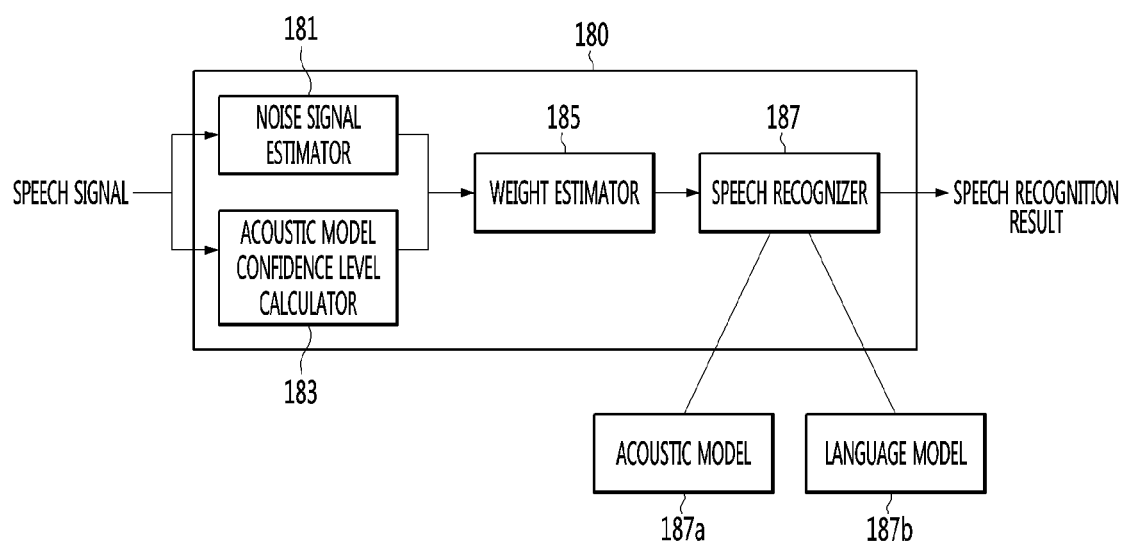
FIG. 13 is a view illustrating the configuration of a processor according to an embodiment of the present disclosure.

FIG. 13 is a view illustrating the configuration of a processor according to an embodiment of the present disclosure.

Although the components of FIG. 13 are described as being included in the processor 180, the present disclosure is not limited thereto and the components may be included in the learning processor 130 of the AI device 100, the learning processor 240 of the AI server 200 or the processor 260 of the AI server 200.

Referring to FIG. 13, the processor 180 may include a noise signal estimator 181, an acoustic model confidence level calculator 183, a weight estimator 185 and a speech recognizer 187.

The noise signal estimator 181 may estimate occurrence of the noise signal from the input speech signal. The noise signal estimator 181 may output a probability that a corresponding unit frame is classified as a noise signal, with respect to each of the plurality of unit frames configuring the speech signal, using a noise estimation model 600.

The noise signal estimator 181 may estimate a probability distribution including a plurality of probability values respectively corresponding to a plurality of unit frames configuring the speech signal.

The acoustic model confidence level calculator 183 may calculate the confidence level of an acoustic model 187*a*. The acoustic model confidence level calculator 183 may calculate the entropy of the acoustic model 187*a* using the probability distribution indicating the distribution of the noise signal within the entire time interval of the speech signal and calculate the confidence level of the acoustic model 187*a* using the calculated entropy. This was described in the embodiment of FIGS. 9 and 10.

The weight estimator 185 may estimate the weight of the acoustic model 187*a* from the probability distribution output from the noise signal estimator 1810 and the confidence level of the acoustic model 187*a*, using the weight estimation model 1100.

The weight estimator 185 may estimate the weight of the acoustic model 187*a* with respect to each of the plurality of unit frames configuring the speech signal. That is, the weight estimator 185 may change the weight of the acoustic model 187*a* over time.

The speech recognizer 187 may determine the weight of the language model 187*b* based on the weight of the acoustic model 187*a*.

The speech recognizer 187 may determine the weight of the language model 187*b*, by subtracting the weight of the acoustic model 187*a* from a predetermined value.

The speech recognizer 187 may output the speech recognition result of the speech signal using the determined weight of the acoustic model 187*a* and the weight of the language model 187*b*.

The acoustic model 187*a* may refer to a model for determining to which phoneme each of the plurality of unit frames configuring the speech signal corresponds.

The acoustic model 187*a* may refer to a model for outputting a probability or score indicating to which phoneme a unit frame (or a unit speech interval) is close.

The language model 187*b* may refer to a model for predicting a next word from a previous word.

The language model 187*b* may refer to a model for assigning a probability to a given word sequence.

The speech recognizer 187 may output a speech recognition result through output of the acoustic model 187a in which the weight is applied to the input speech signal and output of the language model 187b.

The speech recognition result may be text data of a word or a sentence corresponding to the speech signal.

The speech recognition result may be output indicating that the text data has been recognized.

Figure 14:
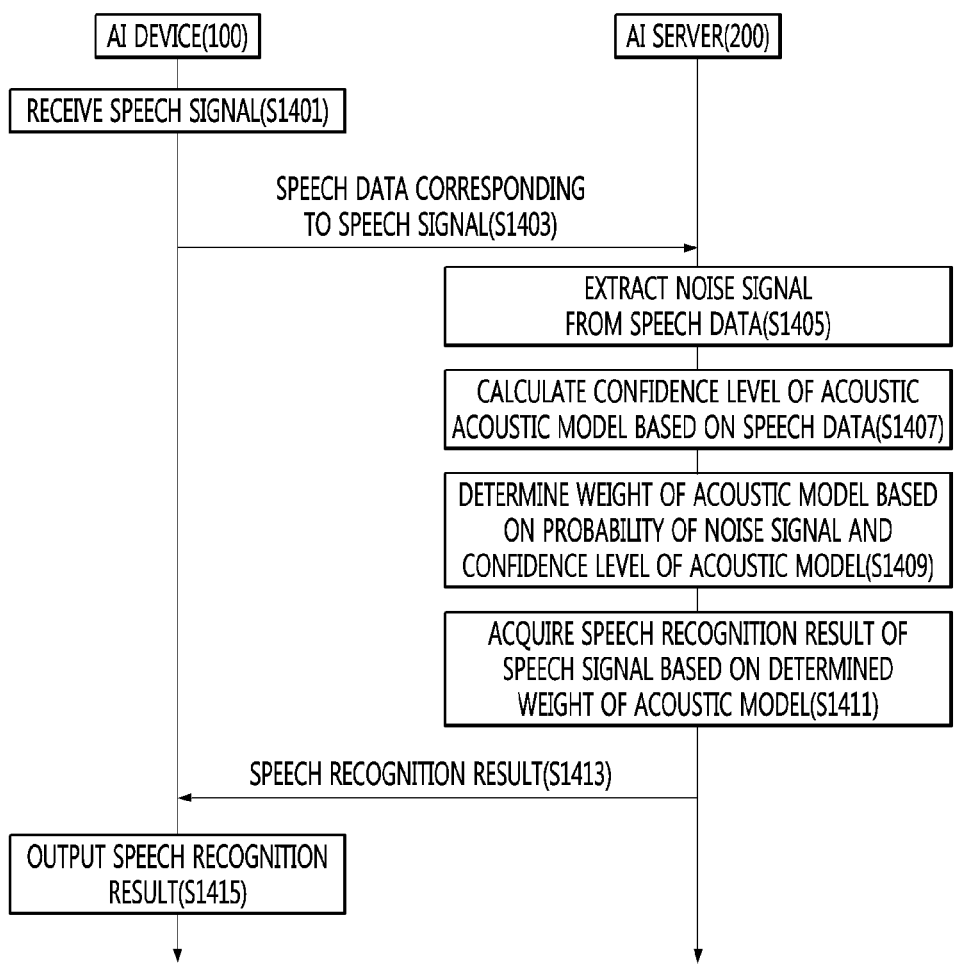
FIG. 14 is a ladder diagram illustrating a method of operating an AI system according to an embodiment of the present disclosure.

FIG. 14 is a ladder diagram illustrating a method of operating an AI system according to an embodiment of the present disclosure.

FIG. 14 is a view illustrating an embodiment in which the weight of the acoustic model 600 is estimated and an entity for acquiring the speech recognition result of the speech signal is the AI server 200.

Referring to FIG. 14, the processor 180 of the AI device 100 receives a speech signal via the microphone 122 (S1401).

The processor 180 of the AI device 100 transmits speech data corresponding to the speech signal to the AI server 200 via the communication unit 110 (also referred to as a communication interface) (S1403).

The processor 260 of the AI server 200 extracts a noise signal from the received speech data (S1405).

The processor 260 may restore the speech signal from the speech data and extract the noise signal from the speech signal.

The processor 260 may acquire a probability that each of a plurality of unit frames configuring the speech signal is classified as noise, using the noise signal estimation model 600 described with reference to FIGS. 6 and 7.

The noise signal estimation model 600 may be stored in the memory 230 of the AI server 200.

The processor 260 of the AI server 200 calculates the confidence level of the acoustic model based on the speech data (S1407).

This is replaced by the description of FIGS. 9 and 10.

The processor 260 of the AI server 200 determines the weight of the acoustic model based on the probability of the noise signal and the confidence level of the acoustic model (S1409).

The processor 260 may determine the weight of the acoustic model based on the weight estimation model 1100 stored in the memory 230.

This is replaced by the description of FIGS. 11 and 12.

The processor 260 of the AI server 200 acquires the speech recognition result of the speech signal based on the determined weight of the acoustic model (S1411).

The processor 260 may determine the weight of the language model based on the weight of the acoustic model and acquire the speech recognition result of the speech signal based on the determined weight of the acoustic model and the weight of the language model.

The processor 260 of the AI server 200 transmits the acquired speech recognition result to the AI device 100 via the communication unit 210 (S1413).

The processor 180 of the AI device 100 outputs the speech recognition result received from the AI server 200 via the output device 150.

According to the embodiments of the present disclosure, it is possible to improve speech recognition performance, by tracking an optimal weight of an acoustic model according to an input speech signal.

In addition, it is possible to greatly improve speech recognition performance, by applying the weight of the acoustic model varying over time to the entire speech signal instead of a fixed weight.

The present disclosure may also be embodied as computer readable codes on a medium having a program recorded thereon. The computer readable medium is any data storage device that may store data which may be thereafter read by a computer system. Examples of the computer readable medium include HDD (Hard Disk Drive), SSD (Solid State Disk), SDD (Silicon Disk Drive), ROM, RAM, CD-ROM, a magnetic tape, a floppy disk, an optical data storage device, or the like. In addition, the computer may include the processor 180 of the AI device.

What is claimed is:

1. An artificial intelligence (AI) device comprising:
a memory;
an output interface including a speaker or a display;
a microphone configured to acquire a speech signal; and
one or more processors configured to:
   determine a first probability that the acquired speech signal is classified as a noise signal,
   determine a confidence level of a first model based at least in part on the acquired speech signal, wherein the first model determines associations between corresponding phonemes to the acquired speech signal,
   determine a first weight of the first model based at least in part on the determined first probability and the determined confidence level of the first model,
   determine a second weight of a second model by subtracting the determined first weight of the first model from a predetermined value, wherein the second model predicts a next word from a previous word, and
   output, via the output interface, a speech recognition result of the acquired speech signal using the determined first weight of the first model and the second weight of the second model.

2. The AI device of claim 1, wherein the first probability is determined based at least in part on determining, using a noise signal estimation model stored in the memory, a second probability that a corresponding portion of the acquired speech signal is classified as a noise signal.

3. The AI device of claim 2,
wherein the noise signal estimation model is a neural network model trained by a deep learning algorithm using training data comprising speech data for learning and labeling data indicating that the speech data is a noise signal, and
wherein the noise signal estimation model is trained to minimize a cost function corresponding to a difference between a third probability indicated by the labeling data and a fourth probability of being classified as the noise signal.

4. The AI device of claim 1, wherein the one or more processors are further configured to:
determine a probability distribution of a plurality of classes corresponding to the acquired speech signal from the first model, and
determine entropy of the first model based on the determined probability distribution, wherein the confidence level of the first model is determined based at least in part on using the determined entropy.

5. The AI device of claim 4, wherein the entropy is determined based on a difference between a largest probability value of the plurality of classes and 1, and wherein the confidence level of the first model is determined based at least in part on determining a reciprocal of the determined entropy.

6. The AI device of claim 1, wherein the weight of the first model is determined based at least in part on using a weight estimation model stored in the memory.

7. The AI device of claim 6,
wherein the weight estimation model is a neural network model trained by a deep learning algorithm using training data comprising a probability value of a noise signal for learning, the determined confidence level of the first model and labeling data indicating a correct answer weight of the first model, and
wherein the weight estimation model is trained to minimize a cost function corresponding to a difference between a particular weight inferred by the weight estimation model and the labeling data.

8. The AI device of claim 1, wherein the determined weight of the first model varies according to each of a plurality of unit frames configuring the acquired speech signal.

9. The AI device of claim 1, wherein the outputted speech recognition result corresponds to a word or a sentence corresponding to the acquired speech signal.

10. A method of operating an AI device, the method comprising:
acquiring a speech signal;
determining a first probability that the acquired speech signal is classified as a noise signal;
determining a confidence level of a first model based at least in part on the acquired speech signal, wherein the first model determines associations between corresponding phonemes to the acquired speech signal;
determining a first weight of the first model based at least in part on the determined first probability and the determined confidence level of the first model;
determine a second weight of a second model by subtracting the determined first weight of the first model from a predetermined value, wherein the second model predicts a next word from a previous word; and
outputting a speech recognition result of the acquired speech signal using the determined first weight of the first model and the second weight of the second model.

11. The method of claim 10, wherein the first probability is determined based at least in part on determining, using a noise signal estimation model stored in a memory, a second probability that a corresponding portion of the acquired speech signal is classified as a noise signal.

12. The method of claim 11,
wherein the noise signal estimation model is a neural network model trained by a deep learning algorithm using training data set comprising speech data for learning and labeling data indicating that the speech data is a noise signal, and
wherein the noise signal estimation model is trained to minimize a cost function corresponding to a difference between a third probability indicated by the labeling data and a fourth probability of being classified as the noise signal.

13. The method of claim 10, further comprising:
determining a probability distribution of a plurality of classes corresponding to the acquired speech signal from the first model, and
determining entropy of the first model based on the determined probability distribution, wherein the confidence level of the first model is determined based at least in part on using the determined entropy.

14. The method of claim 13, wherein the entropy is determined based on a difference between a largest probability value of the plurality of classes and 1, and wherein the confidence level of the first model is determined based at least in part on determining a reciprocal of the determined entropy.

15. The method of claim 10, wherein the weight of the first model is determined based at least in part on using a weight estimation model stored in a memory.

16. The method of claim 15,
wherein the weight estimation model is a neural network model trained by a deep learning algorithm using training data comprising a probability value of a noise signal for learning, the determined confidence level of the first model and labeling data indicating a correct answer weight of the first model, and
wherein the weight estimation model is trained to minimize a cost function corresponding to a difference between a particular weight inferred by the weight estimation model and the labeling data.

17. The method of claim 10, wherein the determined weight of the first model varies according to each of a plurality of unit frames configuring the acquired speech signal.

18. A non-transitory recording medium having recorded thereon a computer program for performing a method of operating an artificial intelligence (AI) device, the method comprising:
acquiring speech signal;
determining a first probability that the acquired speech signal is classified as a noise signal;
determining a confidence level of a first model based at least in part on the acquired speech signal, wherein the first model determines associations between corresponding phonemes to the acquired speech signal;
determining a first weight of the first model based at least in part on the determined first probability and the determined confidence level of the first model;
determine a second weight of a second model by subtracting the determined first weight of the first model from a predetermined value, wherein the second model predicts a next word from a previous word; and
outputting a speech recognition result of the acquired speech signal using the determined first weight of the first model and the second weight of the second model.

* * * * *